United States Patent
Rodowski et al.

(10) Patent No.: US 9,284,396 B2
(45) Date of Patent: Mar. 15, 2016

(54) (METH)ACRYLIC, PROPENE CO-POLYMERS AND A METHOD FOR THEIR PRODUCTION

(71) Applicant: Rohm and Haas Company, Philadelphia, PA (US)

(72) Inventors: C. Damien Rodowski, Downingtown, PA (US); Charles J. Rand, Philadelphia, PA (US); Barry Weinstein, Dresher, PA (US); James DeFelippis, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 3 days.

(21) Appl. No.: 14/543,036

(22) Filed: Nov. 17, 2014

(65) Prior Publication Data
US 2015/0148475 A1 May 28, 2015

Related U.S. Application Data

(60) Provisional application No. 61/907,702, filed on Nov. 22, 2013.

(51) Int. Cl.
| | |
|---|---|
| *C08F 220/06* | (2006.01) |
| *C08L 33/02* | (2006.01) |
| *C08K 5/53* | (2006.01) |
| *C08K 5/5313* | (2006.01) |
| *C08K 5/5317* | (2006.01) |
| *C08J 3/00* | (2006.01) |
| *C08F 220/08* | (2006.01) |
| *C08K 3/32* | (2006.01) |
| *C08L 33/08* | (2006.01) |
| *C08L 33/10* | (2006.01) |

(52) U.S. Cl.
CPC ............ *C08F 220/06* (2013.01); *C08F 220/08* (2013.01); *C08J 3/00* (2013.01); *C08K 3/32* (2013.01); *C08K 5/53* (2013.01); *C08K 5/5313* (2013.01); *C08K 5/5317* (2013.01); *C08L 33/02* (2013.01); *C08L 33/08* (2013.01); *C08L 33/10* (2013.01)

(58) Field of Classification Search
CPC ...... C08F 220/06; C08F 220/08; C08L 33/02; C08K 3/32; C08K 5/53; C08K 5/5313; C08K 5/5317; C08J 3/00
See application file for complete search history.

(56) References Cited

U.S. PATENT DOCUMENTS

| 5,073,299 A | 12/1991 | Cook |
| 5,294,686 A | 3/1994 | Fiarman et al. |
| 6,573,316 B1 | 6/2003 | Albrecht et al. |
| 2014/0275386 A1* | 9/2014 | Rand .................. C08K 3/32 524/414 |

FOREIGN PATENT DOCUMENTS

| EP | 2778183 A1 | 9/2014 |
| WO | 2013070581 A1 | 5/2013 |
| WO | 2013070652 A1 | 5/2013 |

OTHER PUBLICATIONS

McNeill et al., "Thermal degradation behaviour of acrylic salt polymers and ionomers$^a$," Die Angewandte Makromolekulare Chemie, vol. 261/262, No. 4626, 1998, pp. 157-172.
Cárdenas et al., "Thermal properties and TGA-FTIR studies of polyacrylic and polymethacrylic acid doped with metal clusters," European Polymer Journal, vol. 36, 2000, pp. 1091-1099.
Lazzari et al., "Effect of Stereoregularity on the Thermal Behavior of Poly(methacrylic acid)s. 2. Decomposition at Low Temperatures," Macromolecules, vol. 31, 1998, pp. 8075-8082.
McNeill et al., "Thermal Stability and Degradation Mechanisms of Poly(Acrylic Acid) and its Salts: Part 1-Poly(Acrylic Acid)," Polymer Degradation and Stability, vol. 29, 1990, pp. 233-246.

* cited by examiner

*Primary Examiner* — Robert Jones, Jr.
(74) *Attorney, Agent, or Firm* — Andrew E. C. Merriam

(57) ABSTRACT

The present invention provides telomeric copolymers of acrylic and methacrylic acid which further comprise an olefin polymerization residue and have one or more phosphorus acid groups wherein the phosphorus acid group comprises one or more phosphorus atom in the +1 oxidation state or in the +3 oxidation state, or both. In addition the present invention provides methods of making the telomeric copolymers comprising aqueous solution copolymerizing a monomer mixture comprising acrylic acid and methacrylic acid in the presence of a phosphorus acid group containing reactant having a phosphorus atom in the +1 oxidation state, and thermally treating the resulting telomeric copolymer at 175° C. or higher for a sufficient time to decarboxylate the copolymer.

10 Claims, No Drawings

(METH)ACRYLIC, PROPENE CO-POLYMERS AND A METHOD FOR THEIR PRODUCTION

The present invention relates to telomeric copolymers of acrylic acid, methacrylic acid, having alkane groups or copolymerization residues of olefins and methods for making them comprising heating telomeric copolymers of acrylic and methacrylic acid to decarboxylate at least one polymerization residue of (meth)acrylic acid.

Poly(acrylic acid) (pAA) is a less expensive feed stock for making polymeric dispersants and polyacid polymers than is poly(methacrylic acid) (pMAA). The two polyacid polymers, pMAA and pAA, find different commercial uses as dispersants. P-MAAs are used as dispersants and scale removers in high pressure-temperature boilers and pAAs are valued as dispersants for cooling water and detergent applications (*Handbook of Industrial Water Conditioning*, p. 90-91, 8th. Edition, 1980 Betz Laboratories, Inc., Trevose, Pa.).

Polymers or copolymers of methacrylic acid are more thermally stable than are polymers or copolymers of acrylic acid. Thus, pAA or any acrylic acid polymerization residues in polymers or copolymers containing them will decarboxylate at relatively low temperatures, whereas pMAA and its polymerization residues do not decarboxylate to a large extent or reproducibly until temperatures reach in excess of 250° C. and are maintained for an extended duration. However, heat treating p-AA at temperatures in excess of 175° C. results in a loss of molecular weight, decomposition and char (I. C. McNeil, Polymer Degradation and Stability 29, (1990), 233-246, also referred to as degradation which impairs its performance.

The known dispersant pAA and pMAA polymers and copolymers themselves are corrosive to mild steel and known methods to employ or functionalize (i.e. esterify, amidate imidiate, alkylate) them as intermediates require that they be dissolved in water or dispersed in a solvent, which greatly limits their processing flexibility because removal of water or solvent is costly and time consuming, thereby limiting the ease with which one can make useful products from them. Further, heat treating pAA polymers and copolymers and, to a lesser extent, pMAA polymers and copolymers as in the conventional method for functionalizing them will cause them to brown or char upon heating and will cause undesirable polymer degradation.

Recently, an article by Cardenas et al. entitled "Thermal properties and TGA-FTIR studies of polyacrylic and polymethacrylic acid doped with metal clusters" (European Polymer Journal 36 (2000), pp. 1091-1099) disclosed that alkenes may form by dehydrogenation of polyacrylic acid in the presence of metal clusters in the thermal degradation of metal doped polyacid polymers. The metals used by Cardenas are expensive and toxic, all of little commercial utility. The Cardenas article discloses no non-toxic polymer or metal cluster free polymer or any useful end product of thermal degradation. The avoidance of browning or charring or any reproducible polymer that contains any olefin residue is not discussed.

In addition, to date only through the use of expensive and toxic catalysis and other complicated chemical methods has any acrylic or vinyl monomer, not just pAA or pMAA or their copolymers, been polymerized with an olefin monomer. In fact, methods for copolymerization of olefins and vinyl monomers together remain generally elusive. Thus, it would be very desirable to provide an olefin residue containing vinyl or acrylic polymer. The present inventors have sought to solve the problem of providing simple methods of making, thermally stable polyacid polymers of low toxicity having in stable form olefin polymerization residues, i.e. alkanes like propane (—CH—CH(CH3)—), in the polymer backbone.

STATEMENT OF THE INVENTION

1. The present invention provides copolymer compositions comprising phosphorus acid group containing telomeric copolymers of acrylic acid and methacrylic acid and/or salts thereof having a weight average molecular weight (Mw) of up to 20,000, preferably, from 1,000 to 16,000, or, more preferably, 2,000 or more, and having an average of (i) from 19 to 74 wt. %, or, preferably from 25 to 59 wt. % of the copolymerization residue of methacrylic acid, anhydride, or its salts, (ii) from 1 to 20 wt. %, or, preferably, from 4 to 15 wt. % in total of phosphorus acid groups chosen from hypophosphite, phosphite, alkyl phosphinate, alkyl phosphonate, dialkyl phosphinate, and mixtures thereof, (iii) from 0 to 20 wt. %, or, preferably, from 0 to 10 wt. % of the copolymerization residue of a third vinyl monomer, and (iv) from 15 to 80 wt. %, or, preferably, from 25 to 80 wt. %, or, more preferably, from 40 to 62 wt. % of the copolymerization residue of acrylic acid, anhydride, or its salts, the wt. % of all monomers and phosphorus acid group forming reactants being based on the total weight of reactants used to make the telomeric copolymer, wherein the telomeric copolymer comprises at least one copolymerization residue of propene (—CH2—CH(CH3)—).

2. In accordance with item 1 of the present invention, above, the telomeric copolymers can comprise the copolymerization residue of (iii) a third vinyl monomer which is resistant to hydrolysis or which can provide desirable flow properties under processing conditions and which is chosen from a an acrylic or other vinyl comonomer.

3. In accordance with item 2 of the present invention, above, the third vinyl monomer is chosen from itaconic acid, methacrylamide, acrylomorpholine, acrylamide, $C_1$ to $C_6$ alkyl (meth)acrylamides, $C_1$ to $C_6$ dialkyl (meth)acrylamides, styrene, alpha-methyl styrene, sulfonated styrene, such as styrene sulfonic acid and its alkali metal salts, cyanostyrene, hydroxystyrene, acrylonitrile, isopropylacrylamide, t-butylacrylamide, sulfonated acrylamide, such as 2-acrylamido-2-methyl-1-propane sulfonic acid, and its alkali metal salts.

4. In accordance with any of items 1, 2, or 3 of the present invention, above, the telomeric copolymers comprise from 75 wt. % to 100 wt. %, or, preferably, at least 80 wt. %, of the copolymerization residues of acrylic, methacrylic acid, anhydride thereof, salts thereof and propene (—CH2—CH(CH3)—), based on the total weight of monomers used to make the telomeric copolymer.

5. In accordance with any of items 1, 2, 3, or 4 of the present invention, above, the telomeric copolymers comprise powders, pellets, granules or suspensions thereof in non-aqueous carriers, such as oils, e.g., vegetable oils, glycols, polyglycols, ethers, glycol ethers, glycol esters, glymes and alcohols.

6. In another aspect, the present invention comprises methods of making the telomeric copolymer of any of items 1, 2, 3, 4, or 5 of the present invention, above, comprise copolymerizing in an aqueous medium (i) from 19 to 74 wt. %, or, preferably from 25 to 59 wt. % of methacrylic acid, or its salts, (ii) from 1 to 20 wt. %, or, preferably, from 4 to 15 wt. % of a phosphorus acid group containing reactant having at least one phosphorus atom in the +1 oxidation state, the phosphorus acid groups being chosen from sodium hypophosphite, hypophosphorous acid and its salts, phosphinic acid and its salts, such as, for example, phenylphosphinic acid, alkyl phosphinate, alkyl phosphonate, dialkyl phosphinate, and mixtures thereof, (iii) from 0 to 20 wt. %, or, preferably, from 0 to 10 wt. % of a third vinyl monomer, and (iv) from 15 to 80 wt. %, or, preferably, from 25 to 80 wt. %, or, more preferably, from 40 to 62 wt. % of acrylic acid, or its salts, the wt. % of all monomers and phosphorus acid group reactants being based on the total weight of reactants used to make the telomeric copolymer, thermally treating the telomeric copolymer to a temperature ranging from 175° C. to 230° C., or, preferably, from 180 to 220° C. for a sufficient time to cause offgassing and thereby decarboxylate the telomeric copolymer.

7. The thermally treating of the telomeric copolymer is carried out in presence of a radical quenching and or anti-oxidants such as phosphorous +1 oxides, for example, hypophosphorous acid and salts, phenyl phosphinic acid and its salts, butylated hydroxyl toluene (BHT), phenylthiazine or, in the presence radical quenching agents for example, but not limited to 3,3,5,5-Tetramethyl-1-pyrroline N-oxide.

8. Preferably, the thermally treating of the telomeric copolymer is carried under shear or with the telomeric copolymer in the form of a thin film.

9. Preferably, the telomeric copolymers are pre-dried, such as, for example, by spray drying or oven drying to remove excess water before thermally treating them.

The telomeric copolymer may also comprise one or more methacrylic anhydride groups.

As used herein, the term "aqueous" or "aqueous medium" refers to water or a mixture containing 50 wt. % or more, based on the total weight of the mixture, or water and one or more water miscible solvents, such as ethanol.

As used herein, the term "carboxy acid" refers to carboxylic acids and salts thereof.

As used herein, the term "based on the total weight of monomers used to make the telomeric copolymer," refers to the total weight of addition monomers, such as, for example, vinyl or acrylic monomers, used to make a telomeric copolymer but not to the chain transfer agents or any telomerizing phosphorus acid group containing reactants used to make the telomeric copolymer.

As used herein, the term "based on the total weight of reactants used to make the telomeric copolymer" refers to the total weight of addition monomers, such as, for example, vinyl or acrylic monomers, used to make a telomeric copolymer as well as to the telomerizing phosphorus acid group containing reactants used to make the telomeric copolymer.

As used herein, the term "(meth)acrylic acid polymerized units" refers to acrylic or methacrylic acid and/or its salts in polymerized form.

As used herein, the term "molecular weight" or "Mw" refers to a weight average molecular weight as determined by aqueous gel permeation chromatography (GPC) using an Agilent 1100 HPLC system (Agilent Technologies, Santa Clara, Calif.) equipped with an isocratic pump, vacuum degasser, variable injection size auto-sampler, and column heater. The detector was a Refractive Index Agilent 1100 HPLC G1362A. The software used to chart weight average molecular weight was an Agilent ChemStation™, version B.04.02 with Agilent GPC-add on version B.01.01. The column set was TOSOH Bioscience TSKgel G2500PWxl 7.8 mm ID×30 cm, 7 μm column (P/N 08020) (TOSOH Bioscience USA South San Francisco, Calif.) and a TOSOH Bioscience TSKgel GMPWxl 7.8 mm ID×30 cm, 13 μm (P/N 08025) column. A 20 mM Phosphate buffer in MilliQ HPLC Water, pH ~7.0 was used as the mobile phase. The flow rate was 1.0 ml/minute. A typical injection volume was 20 μL. The system was calibrated using poly(acrylic acid), Na salts Mp 216 to Mp 1,100,000, with Mp 900 to Mp 1,100,000 standards from American Polymer Standards (Mentor, Ohio).

As used herein, the term "31-P NMR" or "NMR" refers to NMR spectra determined using, one of the Bruker AVANCE™ 500 and AVANCE™ 300 spectrometers (Bruker, Billerica, Mass.) operating at $^1$H frequencies of 500 MHz, and 300 MHz, respectively. All NMR samples were prepared in 5 mm diameter NMR tubes containing a solution of the analyte polymer in just enough $D_2O$ to form the solution. To make the NMR samples, from 0.3 to 0.35 g of the thermally treated polymer, as a powder, was added to 0.6 g of D2O (Sigma-Aldrich, St. Louis, Mo.) comprising 50 wt. % aqueous caustic in the amount needed to give a pH of from 6-8 as determined by litmus paper. The $^{31}$P NMR spectra were obtained with and without $^1$H decoupling. Quantitative $^{31}$P spectra were acquired using an inverse gate pulse sequence (zgig30) with a recycle delay of 15 seconds. $^{13}$C spectra were acquired at 300 MHz using a j-modulated pulse sequence, and with gated decoupling in order to positively assign CH and $CH_2$ resonances. A single run was done for each polymer tested.

As used herein, the term "phosphorus acid group containing reactant" means any reactant having a phosphorus acid group with a phosphorus atom in the +1 oxidation state, such as a hypophosphorous acid or its salt.

As used herein, the term "phosphorus acid group containing telomeric copolymer" means a refers to a copolymer having a phosphorus acid group with a phosphorus atom in the +1 oxidation state or in the +3 oxidation state, such as an alkyl or a dialkyl phosphinate (+1), or an alkyl phosphonate (+3); the phosphorus acid groups include those as defined, for example, in U.S. Pat. No. 5,294,686 to Fiarman et al.

As used herein, the term "TGA" or thermal gravimetric analysis refers to a method of determining thermal degradation by weight loss as a function of time at temperature of a material in a nitrogen gas or air environment by heating it on a defined temperature ramp (defined in ° C./minute) and measuring the % of weight loss during the heating of the material.

As used herein, the term "wt. %" stands for weight percent.

All ranges recited are inclusive and combinable. For example, a disclosed temperature of from 175° C. to 230° C., or, preferably, from 180 to 220° C., would include a temperature of from 175 to 230° C., from 180 to 230° C., from 175 to 220° C., from 180 to 220° C., and from 220 to 230° C.

Unless otherwise indicated, all temperature and pressure units are room temperature (22-23° C.) and standard pressure.

All phrases comprising parentheses denote either or both of the included parenthetical matter and its absence. For example, the phrase "(meth)acrylic acid" includes, in the alternative, acrylic acid and methacrylic acid.

The present inventors have discovered phosphorus acid group containing acrylic acid and methacrylic acid telomeric copolymers that have propene copolymerization residues or propanes (—CH2—CH(CH3)—). The inventive telomeric copolymers are made inexpensively and without the need for copolymerization of vinyl monomers, like acrylic acid, and olefins, such as propene. In particular, the inventors provide propene (—CH2—CH(CH3)—) residue containing, phosphorus acid group containing (meth)acrylic acid copolymers prepared by a low cost, thermal method. The present inventors have thus surprisingly achieved the goal of incorporating olefinic groups into an acrylic polymer in a simple and inexpensive way by thermally treating the telomeric copolymers so as to release carbon dioxide gas. Particularly, thermally treating phosphorus acid group containing copolymers of acrylic acid and methacrylic acid by melt processing, such as under shear, e.g. by extrusion, or with the telomeric copolymer in the form of a thin film converts the carboxylic acid or salt groups in the (meth)acrylic acid copolymerization residues therein to their corresponding propane groups (—CH2—CH(CH3)—) to form the telomeric copolymers. The resulting inventive telomeric copolymers are much more thermally stable than known acrylic acid containing polymers and act as dispersants to enable one to compatibilize or mix hydrocarbons and aqueous compositions. The telomeric copolymers of the present invention have little bound water and therefore, exhibit limited corrosivity and improved polymer handling properties. Thus, telomeric copolymers of the present invention provide an added measure of thermal stability and thereby enable safe storage and processing of them.

The telomeric copolymers of the present invention are thermally stable over a broad temperature range. Unlike their poly(acrylic acid) or poly(meth acrylic acid) analogues, the phosphorus acid group containing copolymers of acrylic acid and methacrylic acids and/or their salts can be thermally formed without polymer molecular weight loss.

The telomeric copolymers of the present invention may contain at least one methacrylic anhydride group, or, preferably, two or more such groups.

The telomeric copolymers of the present invention have on average at least one phosphorus atom in the +1 or the +3 oxidation state in the polymer that is bound to a carbon atom, as determined by 31-P NMR, and may contain in their compositions free hypophosphorus acid or a salt of hypophosphorus acid such as sodium hypophosphite (NaHP). The phosphorus acid group telomeric copolymers contain as phosphorus acid groups those chosen from any group comprising a bound form of $P^{+3}$ and $P^{+1}$, such as, for example, hypophosphite groups, monoalkylphosphonates, alkyl or dialkyl phosphinates, or their salts. The at least one phosphorus atom in the polymer is bound to a carbon atom of the copolymer, as a terminal or pendant group. The phosphorus atom can appear as a terminal group such as a monoalkylphosphinate ($P^{+1}$) or monoalkylphosphonates ($P^{+3}$), having a vinyl polymer backbone substituent or free phosphite. The at least one phosphorus atom in the polymer backbone can be bound to two carbon atoms, as a phosphite along the carbon chain, such as a diphosphinate having two vinyl polymer backbone substituents. Such phosphorus acid containing polymer groups are described in U.S. Pat. Nos. 5,294,686 and 5,256,746.

In addition to carbon bound phosphorus, the telomeric copolymer compositions may also comprise phosphites ($PO_3^{2-}$) in free form; phosphites comprise a phosphorus atom in the +3 oxidation state. The existence of free phosphites evidences quenching of the carbon radical center after decarboxylation, formation of backbone propane groups or the copolymerization residue of propene (—CH2—CH(CH3)—) and any of the subsequent conversion of hypophosphite to phosphonate. In addition, the generation of polymer bound phosphonate ($P^{+3}$) in excess of that present prior to thermal treatment signifies conversion of monoalkylphosphinate to monoalkyl phosphonate of formation of backbone propane groups or copolymerization residues of propene (—CH2—CH(CH3)—). The polymer compositions of the present invention can comprise a mixture of polymers having at least one phosphorus atom in the polymer backbone bound to two carbon atoms and polymers having at least one phosphorus atom in the polymer backbone bound to one carbon atom thereof.

In accordance with the present invention, the phosphorus acid group containing (methacrylic acid) (pMAA) and (acrylic acid) (pAA) telomeric copolymer starting materials of the present invention can be prepared via, chain transfer polymerization of methacrylic acid (MAA) and acrylic acid (AA) in the presence of a hypophosphorus acid group or sodium hypophosphite salt compound by conventional aqueous solution polymerization methods, such as those described in U.S. Pat. No. 5,294,686, to Fiarman et al., followed by heating the polymer in solution ordry form at a temperature of 175° C. or higher, and up to 230° C., preferably, 180° C. or higher, and, preferably, up to 220° C. Heating time to convert acrylic acid groups to propene copolymerization residues (—CH2—CH(CH3)—) is lower at higher temperatures and generally ranges from about 30 seconds to about 2 hours, or, preferably, 1 minute or more, or, preferably, 1 hour or less, more preferably, up to 3 minutes. Experiments within were conducted on predried polymers held at 200° C. for 30 minutes. The temperature of thermally treating is limited only by the need to avoid thermal degradation or molecular weight loss of the telomeric copolymer; however, time and temperature may readily be optimized for efficiency and low cost. As is understood by the ordinary skilled artisan, the speed at which a thermal treatment process may be completed increases (all other things being equal) with an increase in processing temperature.

Suitable third vinyl monomers for use in making the starting material copolymers used to make the telomeric copolymers of the present invention may be any vinyl or acrylic monomer which is resistant to hydrolysis under processing (melting under shear) conditions, such as itaconic acid, methacrylamide, alkyl or dialkyl (meth)acrylamide, acrylonitrile and methacrylonitrile, acrylomorpholine, styrene, or an acrylic or vinyl monomer which provides desirable flow properties in use, such as $C_1$ to $C_6$ alkyl (meth)acrylates, e.g. ethyl (meth)acrylate. The copolymers containing copolymerized (meth)acrylamide or their (di)alkyl amides will when polymerized and processed by melting under shear form amide or imide containing groups, such as malonamide, malonimide, succinamide, succinimide, adipamide and/or adipimide.

As for suitable third vinyl monomer proportions, adding too much of any third vinyl monomer which is not water soluble, such as styrene, will result in a monomer mixture may be difficult to solution polymerize or which exhibits sluggish reaction kinetics. If one uses too much of any third vinyl monomer, one cannot achieve such a high proportion of methacrylic anhydride groups and may not achieve the corresponding thermal stability conferred by such groups.

The monomer proportions used to make the telomeric copolymer of the present invention comprise (i) from 19 to 74 wt. %, or, preferably, from 25 to 59 wt. % of methacrylic acid, or its salts, (ii) from 1 to 20 wt. %, or, preferably, from 4 to 15 wt. % of a phosphorus acid group containing reactant having at least one phosphorus atom in the +1 oxidation state, the phosphorus acid groups being chosen from sodium hypophosphite, hypophosphorous acid and its salts, phosphinic acid and its salts, such as, for example, phenylphosphinic acid, alkyl phosphinate, alkyl phosphonate, dialkyl phosphinate, and mixtures thereof, (iii) from 0 to 20 wt. %, or, preferably, from 0 to 10 wt. % of a third vinyl monomer, and (iv) from 15 to 80 wt. %, or, preferably, from 25 to 80 wt. %, or, more preferably, from 40 to 62 wt. % of acrylic acid, or its salts, the wt. % of all monomers and phosphorus acid group reactants being based on the total weight of reactants used to make the telomeric copolymer.

Not counting the (ii) phosphorus acid group containing reactant, the monomer proportions used to make the telomeric copolymer of the present invention comprise from 25 wt. % to 80 wt. %, or, preferably, 25 to 60 wt. %, of (iv) acrylic acid or its salts and from 20 to 75 wt. %, or, preferably, from 25 to 60 wt. % of (i) methacrylic acid or its salts, the wt. % of all monomers being based on the total weight of monomers used to make the telomeric copolymer. Thus, if more phosphorus acid group containing reactant is to be used in making the telomeric copolymer, the balance of the monomeric reactants (i), (iii) and (iv) will be made up by reducing the amount of (i) methacrylic acid or its salts or (iii) the third vinyl monomer. If the amount of (i) methacrylic acid or its salts ranges below the inventive monomer proportion of at least 25 wt. %, a molecular weight degradation is observed in the telomeric copolymer. If the amount of (iv) acrylic acid or its salts ranges below the inventive monomer proportion of at least 15 wt. %, the thermally treating of the telomeric copolymer does not provide sufficient decarboxylation to reproducibly generate an alkane or an olefinic copolymerization residue.

If the total amount of both (i) methacrylic acid or its salts and (iv) acrylic acid or its salts does not exceed 75 wt. %, based on the total weight of monomers used to make the telomeric copolymer, the resulting telomeric copolymer will not provide sufficient decarboxylation to reproducibly generate an alkane or an olefinic copolymerization residue. The phosphorus acid group in the poly(acrylic acid-co-methacrylic acid) telomeric copolymer material that is thermally treating can be a phosphorus acid compound, such as, for example, a hypophosphite compound or its salt, e.g. sodium hypophosphite, based on the total weight of reactants (i.e. monomers, phosphorus acid group containing compounds and chain transfer agents) used to make the copolymers.

The telomeric copolymers of the present invention can be prepared from poly (acrylic acid-co-methacrylic acid) telomeric copolymers starting materials by any known melt processing methods which may comprise shearing and heating the material. As is understood by the ordinary skilled artisan, "shear" means that the substrate material being melted under shear will provide resistance against the shearing device, element or mixer in processing, and that there will be at least some substrate material present at all times in the shearing device during processing. Suitable melt processing methods may include any continuous or batch processing methods known in the art for shearing, mixing, compounding, processing or fabrication of thermoplastic, elastomeric or thermosetting polymers or mixtures thereof. Methods include, for example, extrusion, such as in a single-screw or twin-screw extruder; kneading, such as in a single shaft or twin-shaft kneader reactor, banbury mixer, or a Buss-Kneader Reactor or Single screw reciprocating extruder/mixer; evaporation, such as in a wiped film evaporator or falling film evaporator vessel; heated mixing, such as in a continuous stirred tank reactor (CSTR) or single and twin-rotor mixers, for example, PLOUGHSHARE™ Mixers (Littleford Day Inc., Florence, K.Y.), double arm mixers, sigma blade mixers, or vertical high intensity mixer/compounders; processing in a roll mill; a Brabender Plasticorder. An extruder or mixing vessel having one or more ports is a particularly desirable melt mixer, although by no means necessary.

Because thermally treating makes the copolymer starting material go through a melt to form a solid telomeric copolymer when cooled, any dewatering technique can be used prior to or during telomeric copolymer formation, such as dewatering extrusion, oven drying, solvent precipitation or spray drying prior to melt formation.

Removal of water emitted during thermally treating the poly(acrylic acid-co-methacrylic acid) telomer, i.e. as it is converted to the telomeric copolymer of the present invention) can be carried out by such means as vacuum, and/or inert gas purge.

The thermally treating may take place in the presence of a radical quenching anti-oxidant such as, for example, butylated hydroxyl toluene (BHT), phenylthiazine, 3,3,5,5-Tetramethyl-1-pyrroline N-oxide. Other suitable radical quenching anti-oxidants may include, for example, any that are disclosed in U.S. Pat. No. 6,573,316, to Albrecht et al., for example, at column 3 line 35 to column 5 line 25.

The amount of radical quenching anti-oxidants used may range from 0 to 10 wt. %, based on the total solids weight of the poly (acrylic acid-co-methacrylic acid) telomeric copolymer starting material, or, from 0 to 1 wt. %, for example, from 0.01 to 10 wt. % or from 0.05 wt. % to 1 wt. %.

Many uses in a wide variety of applications exist for the telomeric copolymers of the present invention. Such polymers may be particularly useful as builders in detergent compositions, especially powder and liquid detergent compositions, scale removers, polymeric dispersants, such as pigment dispersants for various coatings applications, suspending agents for suspending particulate materials in fluid media, interfacial compatibilizers, scale inhibitors (see for example U.S. Pat. No. 5,604,291 to Kerr et al.) and dispersants, such as for oil recovery, metal corrosion (see, for example, U.S. Pat. No. 5,073,299, to Cook). In addition, such polymers find use as polymeric binders for a textile and non-woven materials, such as glass fiber mats for roofing shingles and batting materials for insulation, and the like.

The phosphorus acid group containing telomeric copolymers of the present invention display reactivity with polyols, and amino-polyols. Such reactivity makes such telomeric copolymers extremely versatile intermediates for the preparation of polymeric surfactants and detergent builders; such reactivity also makes the telomeric copolymers of the present invention useful as thermoset binders with various crosslinkers and organic extenders, such as dextrose; and as pigment dispersants.

The phosphorus acid group containing telomeric copolymers of the present invention find many uses, for example, as thermoset powder binders in combination with polyols, polyamines, alkanolamines, polysaccharides or reducing sugars; and as pigment dispersants, especially in the form of salts.

The following examples illustrate the present invention. Unless otherwise indicated, all parts and percentages are by weight and all temperatures are in ° C.

The following test methods are used in the Examples, below: 31-P NMR spectroscopy: Carried out as defined, above.

COOH titration: Used to determine the amount of decarboxylation, the titration is conducted by placing approximately 0.5 g (record weight to nearest 0.001 g) of polymer sample into a plastic sample cup, and adding approximately 10 ml of deionized (DI) water to the sample cup. This is followed by placing the sample cup on a Radiometer Analytical TitraLab™865 autotitrator (Radiometer Analytical SAS Cedex, FR), and titrating with 0.5N KOH to a pH of 12. The acid number is determined from the following calculation:

$$\text{Acid Number} = \frac{(\text{ml Titrant}) \times (N \text{ Titrant}) \times 56.1}{\text{Grams of Sample}}$$

EXAMPLE 1

Synthesis

An equal molar acrylic acid methacrylic acid (54.4 wt. % MAA, 45.6 wt % AA, based on monomer wt.) and sodium hypophosphite co-telomer aqueous solution prepared by a process described in U.S. Pat. No. 5,294,686 to Fiarman, having a weight average molecular weight of 9000 was oven dried at 150° C. for 30 minutes, ground by mortar and pestle, followed by heating at 200° C. for 30 min. The polymer was characterized at each heating interval as shown in Table 1.

TABLE 1

Effect of Heating a Telomeric Copolymer
(50 mol % AA/50 mol % MAA) of Example 1

| Physical property | Dried (150° C./30 min) | After Heating (200° C./30 min) |
|---|---|---|
| GPC Mw | 9000 | 9000 |
| Titre mequiv COOH/g | 12.3 | 9.4 |
| Appearance | white flake | white foam |
| 31-P NMR | see Table 1A | |

As shown in Table 1, above, the molecular weight is virtually unchanged after thermally treating the poly (acrylic acid-co-methacrylic acid) copolymer starting material. Meanwhile, the titre, milliequiv of COOH/g of material has diminished significantly. This suggests a loss of $CO_2$. However, after the thermally treating the copolymer, there is no discernable decomposition by either Mw measurements or appearance, i.e. char. This is unlike acrylic acid copolymers. Surprisingly, telomeric copolymer exposed to 200° C. for ½ hour is both white and foamed further enforcing the liberation of $CO_2$. Additional conformation for decarboxylation and formation of a propane group in the is visible in the 31-P nmr spectra before and after thermolysis, see Table 2, below.

TABLE 1A

Spectra of Example 1 Telomeric Copolymer at pH 6-7

| Adsorption ppm | Before heating Relative area | After heating Relative area | Assignment |
|---|---|---|---|
| 45-38 ppm | 59.5 | 70.5 | dialkylphosphinate |
| 32-26 ppm | 24.6 | 8.2 | monoalkylphosphinate |
| 26-22 ppm | 1.6 | 13.3 | monoalkylphosphonate |
| 10-7 ppm | 9.0 | 1.4 | NaHP |
| 4-2 ppm | 5.2 | 6.5 | PO3(-2) |

The 31-P NMR results in Table 1A, above, indicates an increase in phosphite content in the composition with a concurrent decrease of hypophosphite. Similarly, the monoalkylphosphonate adsorptions at 22-26 ppm are practically non-existent prior to heating at 200° C., being only 1.6 mol %; however, they are pronounced after heating, being 13.3 mol %. The assigned mono-alkyl phosphonate now is about 62 molar content of phosphorus as defined by the 31P region from 18-32 ppm. The phosphite peak at 4-2 ppm has increased, which suggests oxidation of the phosphorus by radical quenching from newly formed propane groups (—CH2—CH(CH3)—), caused by the decarboxylation of acrylic acid mixed methacrylic acid anhydride. The 13-C NMR not shown also shows the appearance of two new adsorptions at 26.7 and 28.9 ppm.

EXAMPLE 2

Synthesis

A 70/30 weight % poly (acrylic acid-co-methacrylic acid) hypophosphite telomer (26.4 mol % MAA) made in the same manner as the solution copolymer of Synthesis Example 1 was first dried at 150° C. for 30 minutes, then further heated at 200° C. for 30 minutes in a Werner Mathis AG draft oven, see Table 2, below.

TABLE 2

Effect Of Heating A Telomeric Copolymer
of 70 AA/30 MAA as Wt. %. Monomer

| Physical property | Dried (150° C./30 min) | After Heating (200° C./30 min) |
|---|---|---|
| GPC Mw | 8500 | 8500 |
| litre mequiv COOH/g | 11.5 | 11.1 |
| Appearance | white flake | white foam |
| 31-P NMR | see Table 2A | |

As shown in Table 2, above, the 26.4 mol % AA copolymer does not show char or signs of decomposition; the Mw is constant. Further, the acid no. is slightly decreased as decarboxylation is present.

TABLE 2A

Spectra of Polymer from Example 2 at pH 6-7

| Adsorption ppm | Before heating Relative area | After heating (200° C./30 min) Relative area | Assignment |
|---|---|---|---|
| 45-38 ppm | 68.8 | 71.6 | dialkylphosphinate |
| 32-26 ppm | 21.3 | 14.6 | monoalkylphosphinate |
| 26-22 ppm | less than 1.0 | 6.2 | monoalkylphosphonate |
| 10-7 ppm | 5.9 | 3.0 | NaHP |
| 4-2 ppm | 4.0 | 4.6 | PO3(-2) |

1. 31-P Spectra taken at a frequency of 300 MHz.

As shown in Table 2, above, the 31-P NMR spectra indicates an increase in phosphite content with a concurrent decrease of hypophosphite groups (@ 10-7 ppm). Similarly the monoalkylphosphonate adsorptions at 22-26 ppm are practically non-existent prior to heating at 200° C. (<1 mol %) and pronounced after heating (>6 mol % of all phosphorus) In this composition the monoalkylphosphite adsorptions are about ⅓ the total area assign to monosubstituted alkylphosphin(on)ate. Overall, the 31-P NMR data show tell tale signs of hypophosphite oxidation to phosphite and monoalkylphosphinate to alkylphosphonate caused by radical quenching from the presence of newly formed propene copolymerization residue units (—CH2—CH(CH3)—) in the polymer backbone.

COMPARATIVE EXAMPLE 1

A poly(methacrylic acid) sodium hypophosphite copolymer was made by aqueous solution polymerization in the manner described in synthesis Example 1, above. The resulting telomeric polymer was subject to the same thermally treating steps as the Examples 1 and 2, above.

As shown in Table 3, below, the comparative poly(methacrylic acid) telomeric polymer showed a increase in acid titre due to anhydride formation and no change in the 31-P NMR spectrum. This shows that no appreciable decarboxylation and no formation of propane or any copolymerization residue of propene (—CH2—CH(CH3)—) took place in thermally treating the telomeric homopolymer. This is expected because the thermal treatment preferentially decarboxylates acrylic acid—methacrylic mixed anhydride residues to form propene copolymerization residues (—CH2CH(CH3)—).

TABLE 3

Effect of Heating NaHP P-MAA Telomeric Polymer

| Physical property | Dried 150 c./30 min | After 200 C./30 min |
|---|---|---|
| GPC Mw | 5200 | 5200 |
| titre mequiv COOH/g | 10.6 | 11.2 |
| Appearance | white flake | white flake |
| p-31 NMR Spectra @ pH 7 | | No change |

We claim:

1. A copolymer composition comprising a phosphorus acid group containing telomeric copolymer of acrylic acid and methacrylic acid and/or salts thereof having a weight average molecular weight (Mw) of up to 20,000, and having an average of (i) from 19 to 74 wt. % of the copolymerization residue of methacrylic acid, anhydride, or its salts, (ii) from 1 to 20 wt. % of phosphorus acid groups chosen from hypophosphite, phosphite, alkyl phosphinate, alkyl phosphonate, dialkyl phosphinate, and mixtures thereof, (iii) from 0 to 20 wt. % of the copolymerization residue of a third vinyl monomer, and (iv) from 25 to 80 wt. % of the copolymerization residue of acrylic acid, anhydride, or its salts, the wt. % of all monomers and phosphorus acid group forming reactants being based on the total weight of reactants used to make the telomeric copolymer, wherein the telomeric copolymer comprises at least one copolymerization residue of propene (—CH2—CH(CH3)—).

2. The copolymer composition as claimed in claim 1, wherein the telomeric copolymer has a weight average molecular weight (Mw) of from 1,000 to 16,000.

3. The copolymer composition as claimed in claim 1, wherein the telomeric copolymer has an average of (iv) from 40 to 62 wt. % of the copolymerization residue of acrylic acid, anhydride, or its salts, the wt. % of all monomers and phosphorus acid group forming reactants being based on the total weight of reactants used to make the telomeric copolymer.

4. The copolymer composition as claimed in claim 1, wherein the telomeric copolymer comprises the copolymerization residue of (iii) a third vinyl monomer which is resistant to hydrolysis or which can provide desirable flow properties under processing conditions and which is chosen from a an acrylic or other vinyl comonomer.

5. The copolymer composition as claimed in claim 4, wherein (iii) the third vinyl monomer is chosen from itaconic acid, methacrylamide, acrylomorpholine, acrylamide, $C_1$ to $C_6$ alkyl (meth)acrylamides, $C_1$ to $C_6$ dialkyl (meth)acrylamides, styrene, alpha-methyl styrene, sulfonated styrene and its alkali metal salts, cyanostyrene, hydroxystyrene, acrylonitrile, isopropylacrylamide, t-butylacrylamide, sulfonated acrylamide, and its alkali metal salts.

6. The copolymer composition as claimed in claim 1, wherein the telomeric copolymer comprises from 75 wt. % to 100 wt. % of the total copolymerization residues of acrylic, methacrylic acid, anhydride thereof, salts thereof and propene (—CH2—CH(CH3)—, based on based on the total weight of monomers used to make the telomeric copolymer.

7. The copolymer composition as claimed in claim 1, wherein the telomeric copolymers comprise powders, pellets, granules or suspensions thereof in non-aqueous carriers.

8. A method of making a telomeric copolymer composition as claimed in claim 1 comprising copolymerizing in an aqueous medium (i) from 19 to 74 wt. % of methacrylic acid, or its salts, (ii) from 1 to 20 wt. % of a phosphorus acid group containing reactant having at least one phosphorus atom in the +1 oxidation state, the phosphorus acid groups being chosen from sodium hypophosphite, hypophosphorous acid and its salts, phosphinic acid and its salts, phenylphosphinic acid, alkyl phosphinate, alkyl phosphonate, dialkyl phosphinate, and mixtures thereof, (iii) from 0 to 20 wt. % of a third vinyl monomer, and (iv) from 25 to 80 wt. % of acrylic acid, or its salts, the wt. % of all monomers and phosphorus acid group reactants being based on the total weight of reactants used to make the telomeric copolymer, thermally treating the telomeric copolymer to a temperature ranging from 175° C. to 230° C. for a sufficient time to cause offgassing, thereby facilitating decarboxylation of the telomeric copolymer.

9. The method of making a telomeric copolymer composition as claimed in claim 8, wherein the thermally treating of the telomeric copolymer is carried out in presence of a radical quenching agent or an anti-oxidant.

10. The method of making a telomeric copolymer composition as claimed in claim 8, wherein the thermally treating of the telomeric copolymer is carried out under shear.

* * * * *